US006439777B1

(12) United States Patent
Harrison et al.

(10) Patent No.: US 6,439,777 B1
(45) Date of Patent: Aug. 27, 2002

(54) FIBER OPTIC LOOP SUPPORT (76) Inventors: Joseph C. Harrison, 122 Deerlake Dr., Asheville, NC (US) 28803; Andrew T. Piatek, 102 Rumbough Pl., Asheville, NC (US) 28806

( * ) Notice: Subject to any disclaimer, the term of this patent is extended or adjusted under 35 U.S.C. 154(b) by 0 days.

(21) Appl. No.: 09/634,451

(22) Filed: Aug. 8, 2000

Related U.S. Application Data (63) Continuation-in-part of application No. 09/570,801, filed on May 15, 2000.

(51) Int. Cl.[7] .................................................. G02B 6/36
(52) U.S. Cl. ............................ 385/53; 385/66; 385/137
(58) Field of Search ........................... 385/53, 66, 134, 385/136, 137

(56) References Cited

U.S. PATENT DOCUMENTS

| | | | | |
|---|---|---|---|---|
| 4,952,798 A | * | 8/1990 | Graham et al. | 250/227.11 |
| 5,538,438 A | * | 7/1996 | Orlando | 439/344 |
| 6,196,733 B1 | * | 3/2001 | Wild | 385/86 |
| 6,250,817 B1 | * | 6/2001 | Lampert et al. | 385/56 |

* cited by examiner

Primary Examiner—Akm E. Ullah
Assistant Examiner—Jennifer Doan
(74) Attorney, Agent, or Firm—Coats & Bennett, P.L.L.C.

(57) ABSTRACT

A testing device for fiber optic system devices includes a fiber optic loop support that holds a single-mode optical fiber such that an empirically determined loss characteristic associated therewith is unvarying from use to use. In particular, an optical fiber forms a loop, and the loop is supported within a rigid slotted housing. The housing effectively precludes bending losses. Additionally, the housing is small and portable so that field testing may also be performed.

16 Claims, 6 Drawing Sheets

FIBER OPTIC LOOP SUPPORT

RELATED APPLICATIONS

This application is a continuation-in-part of application Ser. No. 09/570,801, filed May 15, 2000, now allowed, the disclosure of which is hereby incorporated by reference in its entirety.

FIELD OF THE INVENTION

The present invention relates to a device that supports a loop of optical fiber such that the loop may be used to test fiber optic-related equipment.

BACKGROUND OF THE INVENTION

Optical fibers were introduced in the early 1970s. Since that time, their use has expanded into numerous settings. Additionally, a number of different forms of optical fibers have appeared. The principle division is between single-mode fibers and multi-mode fibers, with multi-mode fibers being further divided into graded index multi-mode and step-index multimode fibers. As understood in the fiber optic industry, a "mode" is a transverse pattern of energy propagating at a specific velocity through the fiber.

Multi-mode fibers, as the name suggests, support a number of modes. Multi-mode fibers offer the advantages of being able to be coupled to incoherent light sources and having a wider tolerance for alignment with these light sources. Multi-mode fibers may be connected and spliced one to another with a fair amount of latitude. Additionally, multi-mode fibers are generally forgiving when it comes to losses induced by bends in the fiber. That is, the fiber may bend fairly substantially without worry about losses induced by the bend. Two disadvantages of multi-mode fibers are intermodal dispersion wherein different modes may travel at different velocities and relatively high attenuation.

Single mode fibers, in contrast, only support a single mode, namely the $HE_{11}$ mode. Single-mode fibers do not suffer from intermodal dispersion, are generally considered to have higher bandwidth capabilities than multi-mode fibers, and are relatively insensitive to losses induced by local lateral microdisplacements of the fiber from a mean axis (microbending-bends on the order of the size of the core of the fiber). However, single-mode fibers are more susceptible to losses generated by macroscopic bending. As the radius of curvature decreases, losses within the fiber increase. Further, greater care when splicing single-mode fibers is required.

Those who use fibers are greatly concerned with losses because loss dictates how far a signal will propagate within the fiber and still be usable. While amplifiers may counteract losses, each amplifier in a system increases costs and requires additional connective infrastructure. Knowledge of a loss profile of a fiber is extremely helpful when designing fiber based systems so that appropriate hardware or signal processing is used to compensate for the known losses.

In 1998, SIECOR introduced a duplex connector to replace the traditional SC type connector. This new connector, known as the MT-RJ, is approximately the size of a phone plug, allowing connector density within fiber systems to double effectively over the old SC type connectors and achieve densities equal to, or in some cases better than, copper-based systems. The MT-RJ has rapidly become the industry standard for fiber optic systems. An additional feature of the MT-RJ connector is its ability to be used with both single-mode and multi-mode fibers.

As a result of the rapid acceptance of the MT-RJ, new devices within fiber optic systems are now being equipped with MT-RJ female receptacles to mate with the male end of the MT-RJ. Manufacturers of such devices include CISCO, 3COM, and others within the telecommunications industry. Examples of such devices include Optical Time Domain Reflectometers (OTDRs), routers, optical transceivers, optical amplifiers, and the like. Specific examples include the CATALYST 8500 family of non-blocking multiservice switch routers from CISCO, the CFX-1433M 100 Mbps Fast Ethernet Hub from Canary Communications, and 12R-J3200A HP ADVANCESTACK 10base-T Hubs. However, these devices must frequently be tested to see if they are functioning properly. This is especially important before shipping to a consumer, as the companies producing these devices do not want to ship defective products. Additionally, it may be desirable to test these devices after installation to verify that they are not the source of system failure.

SIECOR has introduced a device coupled to an MT-RJ connector that allows testing of system devices using multi-mode fibers. However, this device has a flexible fiber element and is inappropriate for use with a single-mode fiber. In particular, this device is especially susceptible to drooping as a result of temperature increases. This droop induced bending is acceptable in a multi-mode fiber, but not for a comparable single-mode fiber. As a result, there is still a need for a device that utilizes a single-mode fiber to test the functionality of fiber optic system devices.

In response to the popularity of the MT-RJ connector, LUCENT has introduced a connector that is not a duplex connector, but two of these connectors may be paired with a yoke to form a duplex connector. The LUCENT connector is approximately a third to a half the size of the MT-RJ, and may rapidly reach the market saturation of the MT-RJ. Many of the concerns about the ability to test devices that use MT-RJs will be true of devices that use the LUCENT connectors, and thus, there will be a comparable need for an appropriate testing device. The LUCENT device is embodied in U.S. Pat. No. 6,196,713, and is known by the commercial name LC.

SUMMARY OF THE INVENTION

The shortcomings of the prior art are addressed by providing a rigid support that holds a single-mode fiber in a position with a relatively constant or repeatable loss profile and further is adapted to connect to an MT-RJ connector. An exemplary embodiment of the present invention comprises a generally planar, rigid, plastic housing. The housing may be approximately three and a half (3.625) inches long and have a slotted first end. The slot gives access to a cavity extending substantially the length of the housing, in effect forming a sleeve. The slot includes an arcuate center area sized to accommodate the standard protuberance on the end of a standard MT-RJ connector. In use, a single-mode fiber or filament is secured to the MT-RJ and then slipped into the slot. The protuberance on the MT-RJ may be secured to the housing to form the testing device. In essence, the support acts like a sleeve positioned over the filament that is secured to the MT-RJ. The loss characteristics of the testing device may then be determined empirically, and the testing device labeled with appropriate indicia indicative of the empirically determined loss characteristic. Subsequently, the testing device may be used repeatedly to verify the functionality of other fiber optic system devices. The housing holds the filament loop such that the loss characteristic of the loop does not change between uses and likewise is not susceptible to bending such as may occur in the SIECOR multi-mode testing unit.

Another embodiment is adapted to be used with LUCENT's duplex connector pair. The method and support remain relatively unchanged, however the attachment interface between the support and the connector reflects the different shape and size of the LUCENT device.

DETAILED DESCRIPTION OF THE PREFERRED EMBODIMENTS

Figure 1:
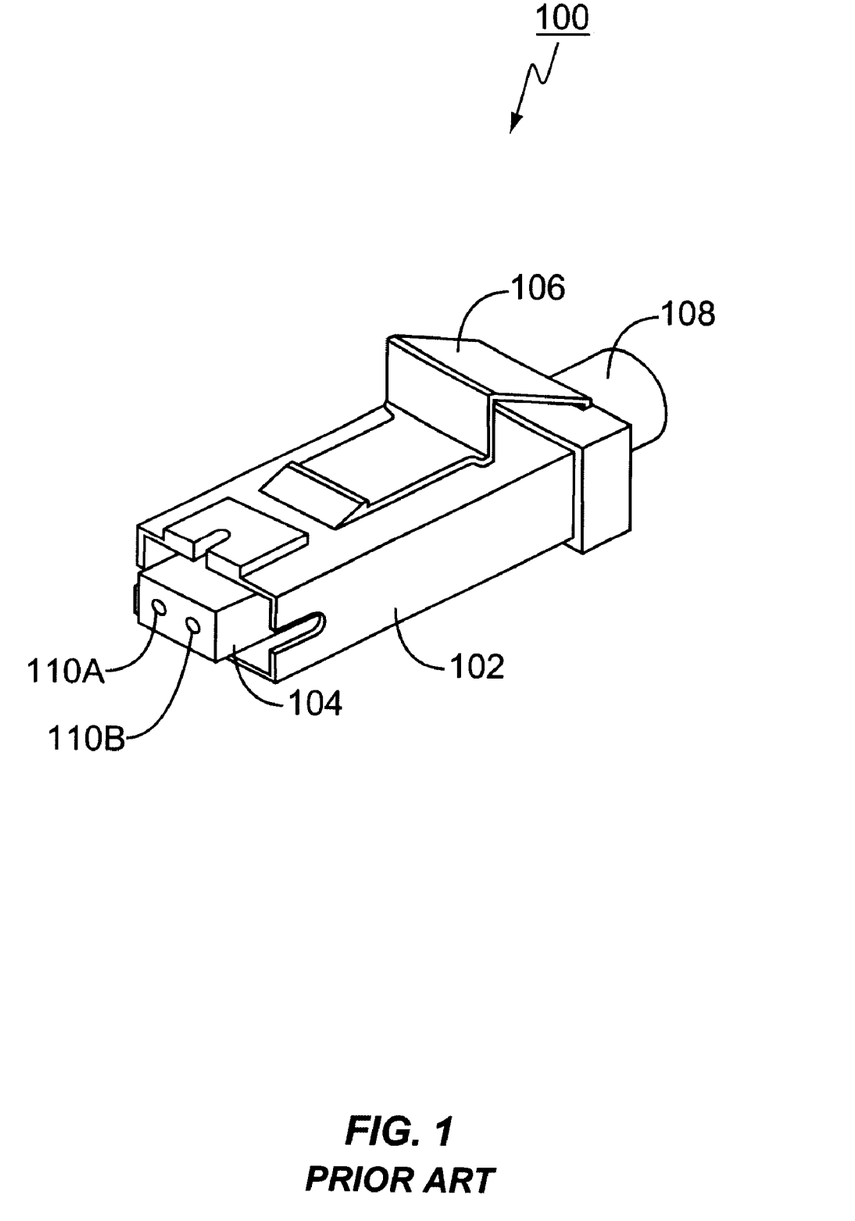
FIG. 1 is a perspective view of a prior art MT-RJ connector.

A typical MT-RJ connector 100 is shown in FIG. 1. MT-RJ connector 100 includes a body 102 having a spring-mounted fiber interface 104 contained therein. A biased clip 106 allows the MT-RJ 100 to be secured in a conventional receptacle or fiber optic system device (neither shown). A protuberance 108 provides a connective surface for a fiber or filament (the terms are used interchangeably herein) to be connected to the MT-RJ 100. In particular, most fibers are covered by at least two protective coatings. A strain relief (not shown) is secured to the protective coating and to the protuberance. The fiber interface 104 includes duplex fiber orifices 110A and 110B. It should be appreciated that the MT-RJ 100 is approximately the size of a conventional phone plug and, thus, is highly desirable in the fiber optic industry to improve density over the old SC connectors. MT-RJ 100 may be used with both single-mode and multi-mode fibers. In practice, optical fibers are secured at a first end to the fiber interface 104, with the second end extending through the protuberance 108. Light is then transmitted and received through orifices 110A and 110B. For example, light may be transmitted through orifice 110A, down a filament to a remote transceiver that replies with a light signal transmitted through a second filament and received through orifice 110B by the original transceiver. Thus, the two orifices 110A and 110B allow for duplex communications.

Figure 2:
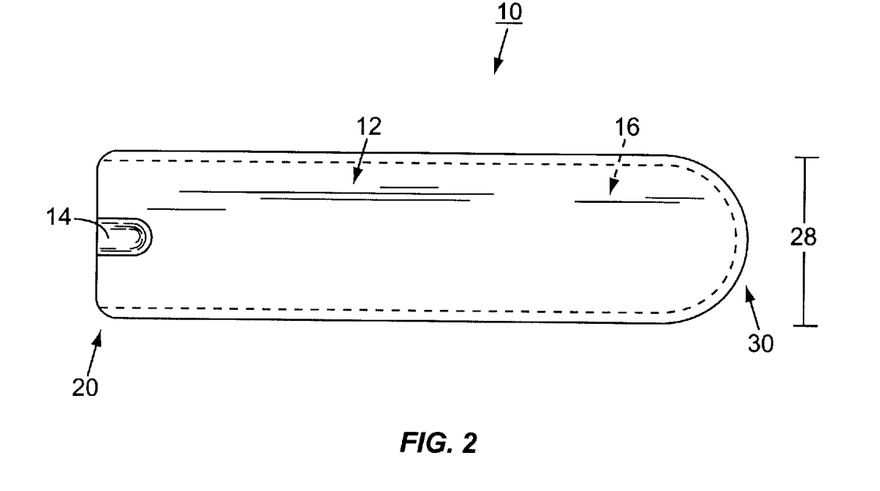
FIG. 2 is a top plan view of the fiber optic loop support of the present invention.
Figure 3:
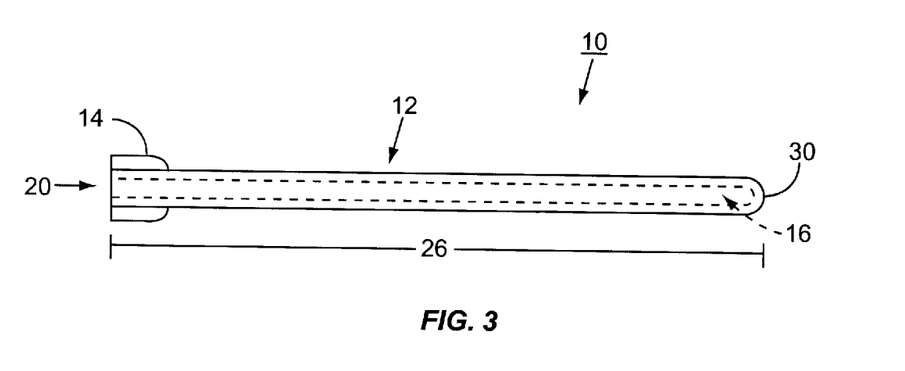
FIG. 3 is a side elevational view of the support of FIG. 2.
Figure 4:
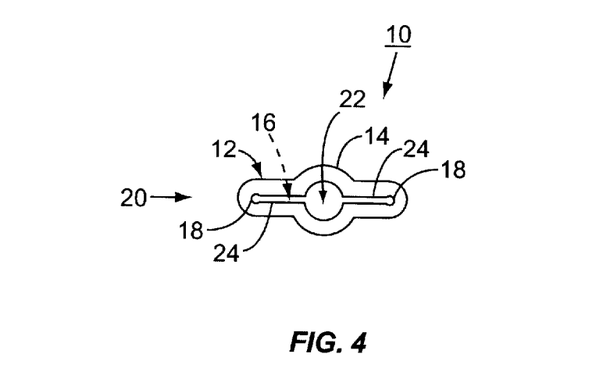
FIG. 4 is a front elevational view of the support of FIG. 2.

As noted, single-mode fibers are especially susceptible to losses induced by macroscopic bending. Thus, if a testing device is to be created for a single-mode fiber, that device must be able to support the single-mode fiber such that the loss profile of the fiber remains relatively constant between uses. While loss is acceptable, a fiber with a variable loss is not acceptable. To this end, a fiber optic loop support 10 is illustrated in FIGS. 2–4. Specifically, the fiber optic loop support 10 includes a substantially rigid body 12, preferably made out of a durable plastic. At a first end 20 of the elongated body 12, a protuberance receptacle 14 is positioned. Protuberance receptacle 14 includes an aperture 22 (FIG. 4) which is sized appropriately to receive the protuberance 108 of an MT-RJ 100. On either side of the aperture 22, a slot aperture 24 is located. On the terminal ends of slot aperture 24 are rounded end points 18. Note that rounded end points 18 are purely optional, and the housing may include squared off endpoints that may be easier to manufacture in a molding process. Slot aperture 24 and aperture 22 open into cavity 16 that extends substantially the length of the body 12. As a further optional feature, the body 12 may include a through hole (not shown) near second end 30.

In an exemplary embodiment, the body 12 is approximately three and a half inches (3.625) long, as indicated by length 26, and approximately one-half inch (0.683) wide, as indicated by width 28. Second end 30 has a vertical radius of approximately ⅓₂ inch (FIG. 3). Slot aperture 24 has a vertical height of approximately 0.045 inch and rounded end points 18 have a radius of approximately 0.04 inch. The walls of the housing may be approximately 0.062 inch thick when made from a plastic material such as PVC, ABS, polycarbonate, or the like. These dimensions are for illustrative purposes only and are not intended to be limiting; however, dimensions such as those recited do provide adequate size and space for the present invention to be practiced. At a very minimum, the slot height should be sufficiently large to insert a 250 micron optical fiber therein.

It should be appreciated that fiber optic supports other than that described are also contemplated. Size, shape, material, and the like may be varied. Since the purpose of the support is to prevent unanticipated losses, the support should keep the optical fiber positioned such that the loss profile associated with the fiber is relatively uniform from use to use. Note further that the present invention could also be used with a multi-mode fiber if desired.

Figure 5:
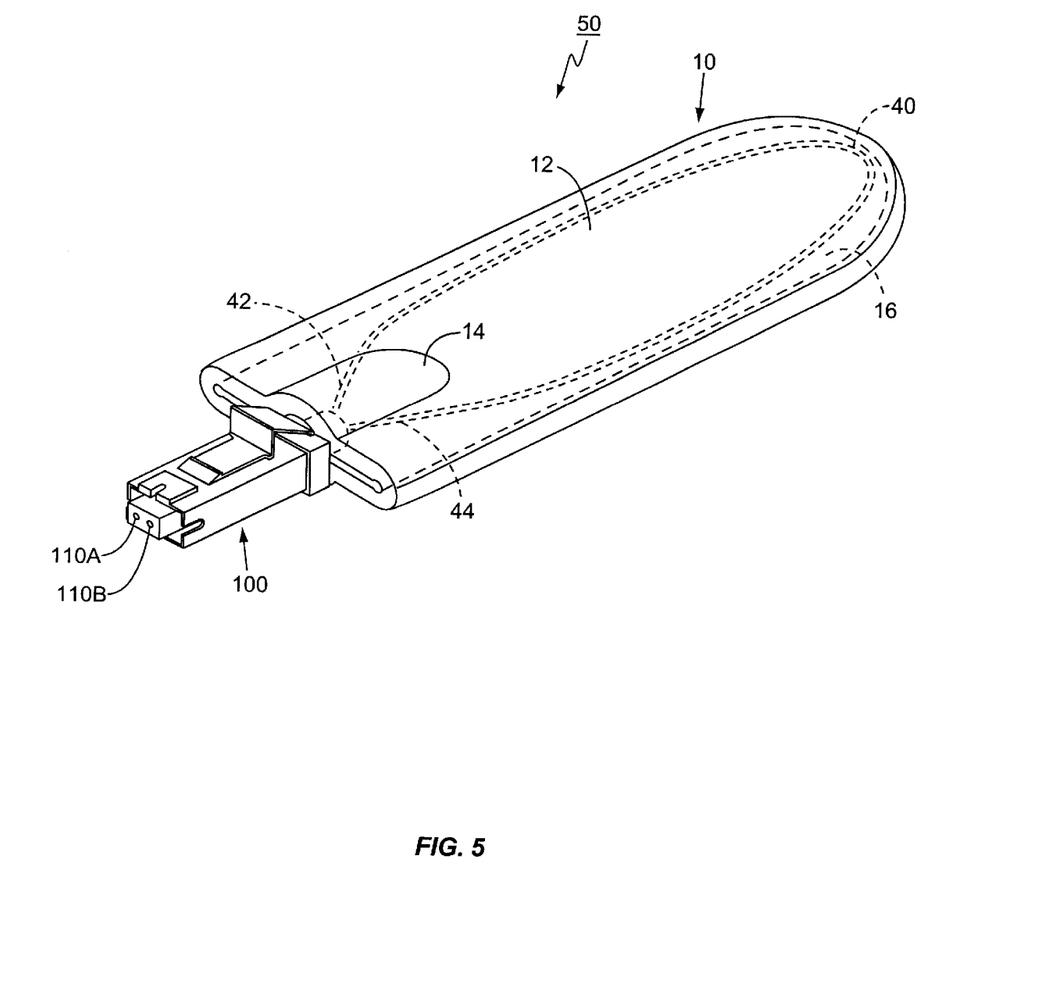
FIG. 5 is a perspective view of the support coupled to the connector to form a testing device.

A completed testing device 50 is shown in FIG. 5 comprising a loop support 10 and an MT-RJ 100, coupled with a single-mode optical fiber 40. The single-mode fiber 40 is secured to the MT-RJ 100 in a looped fashion with a first end 42 operating through orifice 110A and a second end 44 operating through orifice 110B. The looped portion of the fiber 40 extends from the interface 104, out through the protuberance 108. After securing the fiber 40 to the MT-RJ 100, the fiber 40 is placed within the cavity 16, such as by simple insertion, and allowed to rest therein. The protuberance 108 may be pressure fit within aperture 22 but may, alternatively, be secured through a conventional adhesive or other fastener. While the loop of fiber 40 is shown in one configuration, it should be appreciated that the actual configuration may be almost any shape within the cavity 16.

Figure 6:
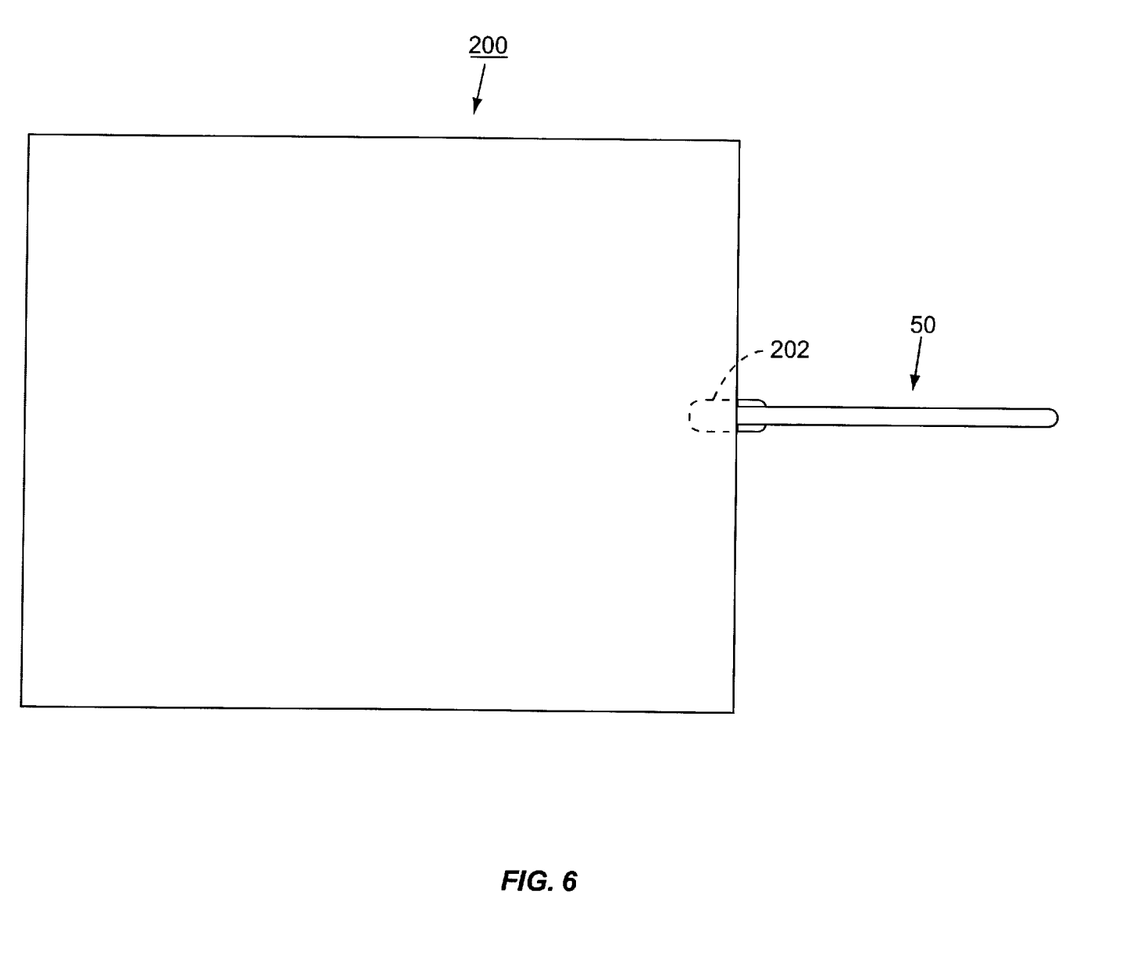
FIG. 6 is a simplified version of the testing device in use to test a fiber optic system device.

In use, a loss characteristic of the testing device 50 is empirically determined after assembly. Appropriate indicia may be placed on the testing device 50 on a planar surface or with the accompanying literature. For example, the testing device could be labeled "1 dB loss" if in fact the testing device 50 had a 1 dB loss. In use, the MT-RJ 100 end of the testing device is inserted like a conventional connector into a female receptacle 202 on the device 200 (FIG. 6). Thus, when the testing device 50 is used to determine whether the piece of equipment 200 is working properly, a known signal may be transmitted from device 200 through the loop of fiber 40 and back to the device 200. The output received through orifice 110B may then be compared to the original transmitted waveform. The output is compensated for the known loss characteristics of the testing device 50 and, if the waveforms match, the device 200 is working properly.

Testing device 50 may be used repeatedly, such as on an assembly line to verify that each device 200 produced is functioning properly. The loss characteristic of testing device 50 does not change significantly from test to test, allowing quick and easy verification of the operability of the device 200. Further, the testing device 50 is small, light weight, and easily portable, allowing for field use as well. During installation of fiber optic system components in the field, the testing device 50 may be used to verify operability of the device 200 after shipping and handling. Additionally, the ease of use of the MT-RJ connector 100 used with the testing device 50 means that even in installed systems, the testing device 50 may be used to help isolate failures.

Figure 7:
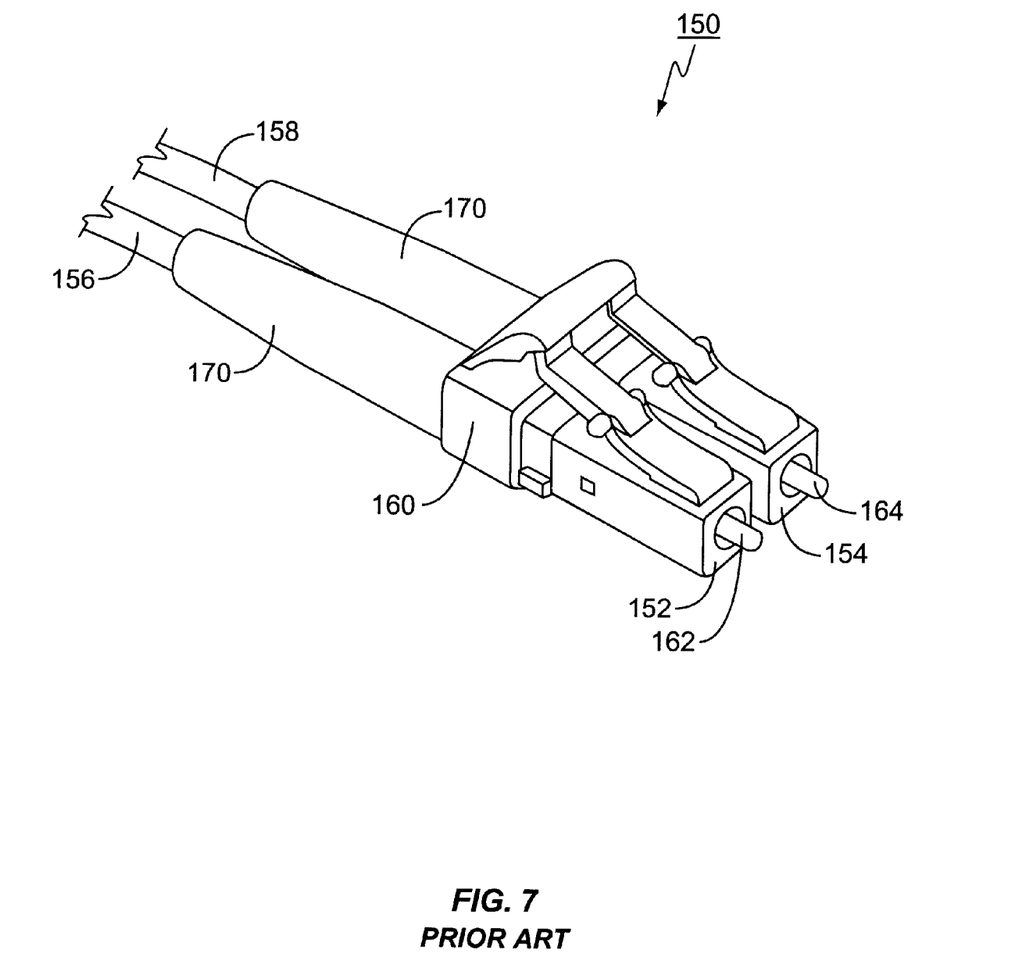
FIG. 7 is a perspective view of prior art LUCENT connectors forming a duplex connector pair.

A prior art LUCENT duplex connector pair 150 is illustrated in FIG. 7. In particular, the duplex connector pair 150 includes a first connector 152, a second connector 154 and a yoke 160. The duplex connector pair 150 is linked to optical fibers 156, 158 through connectors 152, 154 respectively. Yoke 160 holds connectors 152 and 154 together. Each connector 152, 154 has an interface 162, 164 respectively that operates to allow transmission from a source into optical fibers 156, 158 respectively. Yoke 160 in effect acts as a protuberance. Strain reliefs 170 may be positioned over fibers 156 and 158 abutting yoke 160 as needed or desired. Note that yoke 160 is generally rectilinear.

Figure 8:
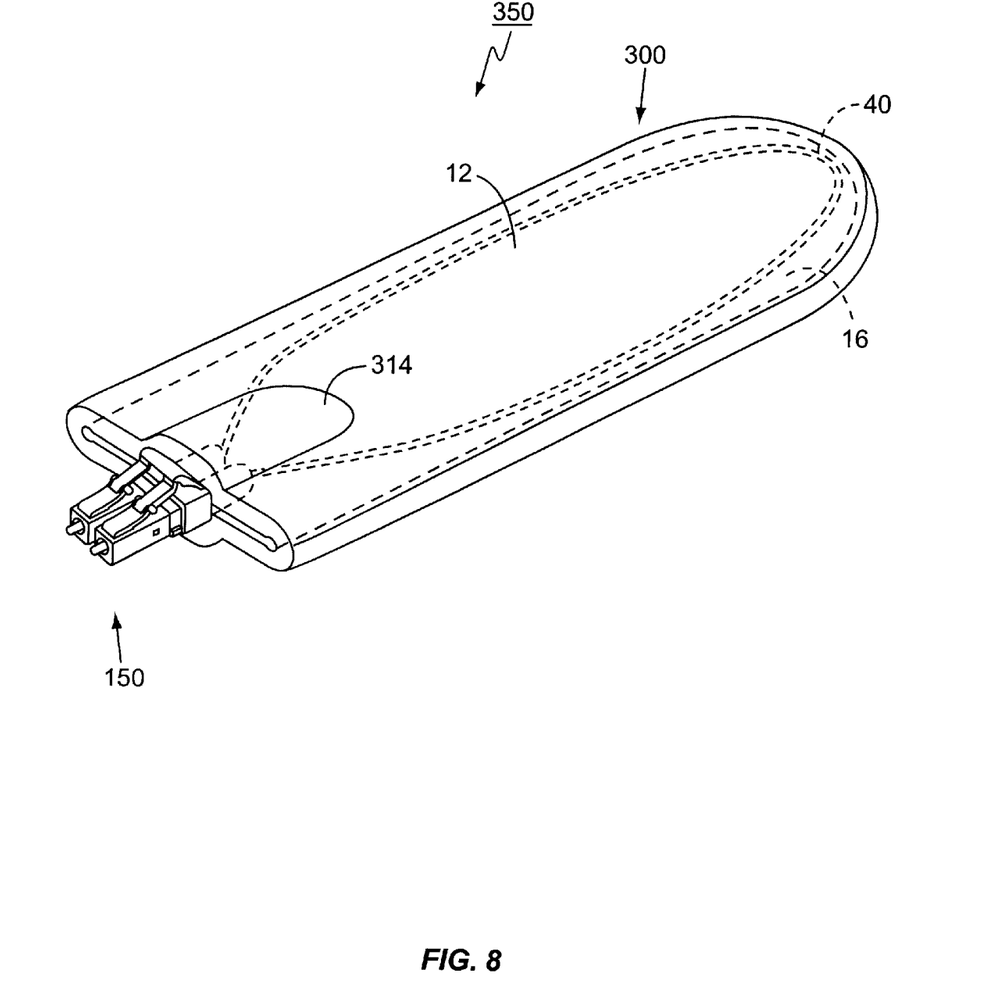
FIG. 8 is a perspective view of the support coupled to the duplex connector pair of FIG. 7 to format a testing device.

FIG. 8 illustrates the LUCENT duplex connector pair 150 secured to a loop support 300 thereby forming a testing device 350. Support 300 is substantially similar to support 10, however the protuberance receptacle 14 has been changed to yoke receptacle 314 to accommodate the yoke 160. Cavity 16 and elongated body 12 remain essentially the same. Likewise, apertures 22 and 24 remain essentially the same although the protuberance aperture has been resized to accommodate the yoke 160.

A single-mode optical fiber 40 forms a loop between first connector 152 and second connector 154. The looped portion of the fiber 40 extends from the interface 162, out through the yoke 160, back to the yoke 160, and to the interface 164. After securing the fiber 40 to the duplex connector pair 150, the fiber 40 is placed within the cavity 16, such as by simple insertion, and allowed to rest therein. The yoke 160 may be pressure fit within protuberance receptacle 314, just as was described with respect to protuberance 108, with accommodations for the different size and shape of the yoke 160, but may, alternatively, be secured through a conventional adhesive or other fastener. While the loop of fiber 40 is shown in one configuration, it should be appreciated that the actual configuration may be almost any shape within the cavity 16.

In use, a loss characteristic of the testing device 350 is empirically determined after assembly. Appropriate indicia may be placed on the testing device 350 on a planar surface or with the accompanying literature. For example, the testing device could be labeled "1 dB loss" if in fact the testing device 350 had a 1 dB loss. In use, the duplex connector pair 150 end of the testing device is inserted like a conventional connector into a female receptacle 202 on the device 200 (not shown, but comparable to FIG. 6). Thus, when the testing device 350 is used to determine whether the piece of equipment 200 is working properly, a known signal may be transmitted from device 200 through the loop of fiber 40 and back to the device 200. The output received through interface 164 may then be compared to the original transmitted waveform. The output is compensated for the known loss characteristics of the testing device 350 and, if the waveforms match, the device 200 is working properly.

Testing device 350 may be used repeatedly, such as on an assembly line to verify that each device 200 produced is functioning properly. The loss characteristic of testing device 350 does not change significantly from test to test, allowing quick and easy verification of the operability of the device 200. Further, the testing device 350 is small, light weight, and easily portable, allowing for field use as well. During installation of fiber optic system components in the field, the testing device 50 may be used to verify operability of the device 200 after shipping and handling. Additionally, the ease of use of the duplex connector pair 150 used with the testing device 350 means that even in installed systems, the testing device 350 may be used to help isolate failures.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A testing device for use with a device, said testing device comprising:

a duplex connector pair comprising a yoke, said yoke having a protuberance;

an optical fiber operatively secured to said duplex connector pair; and a rigid support for holding said fiber such that losses induced in said fiber are substantially nonvarying from use to use of the testing device.

2. The testing device of claim 1 wherein said duplex connector pair comprises at least one LUCENT connector.

3. The testing device of claim 1 wherein said fiber is a single-mode optical fiber.

4. The testing device of claim 1 wherein said support comprises a slotted housing having an interior cavity and said fiber is positioned therein.

5. The testing device of claim 4 wherein said housing includes a first end including a yoke receptacle thereon.

6. The testing device of claim 5 wherein said duplex connector pair comprises at least one LUCENT connector and said yoke receptacle is adapted to receive said yoke positioned on said duplex connector pair.

7. The testing device of claim 1 wherein said duplex connector pair further comprises at least one LUCENT LC connector;

wherein said optical fiber comprises a single-mode optical fiber; and wherein said rigid support comprises a single molded piece of plastic comprising a generally planar interior portion on which said optical fiber rests; said rigid support further comprising a yoke receptacle, said yoke receptacle receiving said protuberance of said yoke.

8. A fiber optic loop support comprising:

rigid housing;

connector receptacle positioned on said housing and adapted to receive a yoke secured to an optical duplex connector pair; and said housing including a surface adapted to receive an optical fiber positioned thereon such that losses induced in said fiber are substantially nonvarying between uses of said fiber.

9. The fiber optic loop support of claim 8 further including a single-mode optical fiber positioned on said surface.

10. The fiber optic loop support of claim 9 wherein said housing includes an interior chamber and said fiber is positioned within said interior chamber.

11. The fiber optic loop support of claim 8 wherein said housing is generally planar.

12. A method of testing a fiber optic system device, comprising:

inserting a yoke secured to a duplex connector pair attached to a fiber optic loop support containing a loop of optical fiber into a yoke receptacle on a first end of the fiber optic system device; and maintaining the loop substantially free of later introduced bends such that the loss characteristic of the loop is substantially constant.

13. The method of claim 12 further comprising removing the connector from the fiber optic system device.

14. The method of claim 13 further comprising subsequently inserting the connector into a second fiber optic system device.

15. The method of claim 14 wherein the loss characteristic of the loop remains substantially constant for both insertions.

16. A method of manufacturing a fiber optic testing device, comprising:

attaching an optical fiber to a duplex connector pair including a yoke;

inserting the fiber into a loop support having a yoke receptacle such that the fiber has a relatively constant loss characteristic; and securing the connector to the loop support, such that the yoke receptacle receives the yoke.

* * * * *